United States Patent
Hsu-Hung et al.

(10) Patent No.: US 10,013,280 B2
(45) Date of Patent: Jul. 3, 2018

(54) SYSTEM AND METHOD FOR HOST-ASSISTED BACKGROUND MEDIA SCAN (BMS)

(71) Applicant: Dell Products, LP, Round Rock, TX (US)

(72) Inventors: Damon Hsu-Hung, Sudbury, MA (US); Paul David Guttormson, Brookline, NH (US); Bernard Abraham Rozmovits, Mildford, MA (US)

(73) Assignee: Dell Products, LP, Round Rock, TX (US)

( * ) Notice: Subject to any disclaimer, the term of this patent is extended or adjusted under 35 U.S.C. 154(b) by 125 days.

(21) Appl. No.: 14/042,313

(22) Filed: Sep. 30, 2013

(65) Prior Publication Data

US 2015/0095913 A1    Apr. 2, 2015

(51) Int. Cl.
G06F 9/46 (2006.01)
G06F 9/48 (2006.01)

(52) U.S. Cl.
CPC ............ *G06F 9/4843* (2013.01); *G06F 9/485* (2013.01)

(58) Field of Classification Search
CPC ........................................................ G06F 9/52
See application file for complete search history.

(56) References Cited

U.S. PATENT DOCUMENTS

| | | |
|---|---|---|
| 5,313,626 A | 5/1994 | Jones et al. |
| 7,515,500 B2 | 4/2009 | Ahvenainen et al. |
| 7,694,026 B2 * | 4/2010 | Huffman ............... G06F 3/0611 710/5 |
| 7,936,610 B1 | 5/2011 | Melcher et al. |
| 8,032,724 B1 | 10/2011 | Smith |
| 8,190,945 B2 | 5/2012 | Nadeau et al. |
| 8,364,918 B1 | 1/2013 | Smith |
| 2005/0160425 A1 * | 7/2005 | Falsett ................. G06F 9/4812 718/100 |

(Continued)

FOREIGN PATENT DOCUMENTS

IN    201617007216    8/2016

OTHER PUBLICATIONS

Notification of Transmittal of The International Search Report and Written Opinion for PCT/US2013/73856 dated Mar. 10, 2014; entitled "A System and Method for Host-Assisted Background Media Scan (BMS)".

(Continued)

*Primary Examiner* — Emerson Puente
*Assistant Examiner* — Steven Do
(74) *Attorney, Agent, or Firm* — Hamilton, Brook, Smith & Reynolds, P.C.

(57) ABSTRACT

Many storage devices (or drives) include a mechanism, such as a processor, to execute internal maintenance process(es) that maintain data integrity and long-term drive health. One example of such an internal maintenance process is a background media scan (BMS). However, on busy systems, the BMS may not have an opportunity to execute, which can damage long term drive performance. In one embodiment, a method includes sending a command from a host device to a storage device. The storage device can responsively run an internal maintenance process of the storage device. In one embodiment, the internal maintenance process can be an internal maintenance process such as a background media scan.

20 Claims, 6 Drawing Sheets

(56) References Cited

U.S. PATENT DOCUMENTS

| | | |
|---|---|---|
| 2006/0161728 A1 | 7/2006 | Bennett |
| 2008/0155301 A1* | 6/2008 | Ahvenainen et al. ............ 714/1 |
| 2010/0169540 A1* | 7/2010 | Sinclair ............... G06F 12/0246 |
| | | 711/103 |
| 2010/0202786 A1* | 8/2010 | Ikeno ................. G03G 15/5012 |
| | | 399/11 |
| 2012/0066451 A1 | 3/2012 | Fujihara |
| 2012/0124217 A1* | 5/2012 | Bartley ............... H04L 12/2863 |
| | | 709/227 |
| 2013/0151839 A1* | 6/2013 | Rowles .................... G06F 9/06 |
| | | 713/100 |
| 2014/0176495 A1* | 6/2014 | Vlasov .......................... 345/174 |

OTHER PUBLICATIONS

International Preliminary Report on Patentability for PCT/US2013/073856 dated Apr. 14, 2016 entitled "System and Method for Host-Assisted Background Media Scan (BMS)".

Supplementary European Search Report for EP 13 89 4426 dated Mar. 28, 2017 entitled "Host-assisted background media scan (BMS)".

* cited by examiner

SYSTEM AND METHOD FOR HOST-ASSISTED BACKGROUND MEDIA SCAN (BMS)

BACKGROUND

Storage devices can include mechanisms to execute internal maintenance processes. These internal maintenance processes execute upon the drive being idle for a certain period of time, for instance. The processes can determine problems of the drive and, if possible, repair them before any data is damaged.

SUMMARY

In one embodiment, a method includes sending a command from a host device to a storage device. The storage device can responsively run an internal maintenance process of the storage device.

In one embodiment, the internal maintenance process can be an internal maintenance process. The internal maintenance process can be a background media scan. The internal maintenance process can be at least one of garbage collection, wear-leveling, and erase management. The internal maintenance process can also be a nondestructive internal maintenance process. The nondestructive internal maintenance process can exclude destructive internal maintenance processes such as formatting and erasing/deleting. The internal maintenance process can further be a long running internal maintenance process. The internal maintenance process can also be invasive to performance.

In another embodiment, the method can include scheduling the command at the host device. Scheduling the command can also include determining a particular time based on the host being idle. Scheduling the command can further include scheduling a time period for the command and a time period for an input/output command. Scheduling the command can additionally include determining a level of progress of the internal maintenance process and sending the command at a frequency as a function of the level. Scheduling the command can also include scheduling the command based on a statistical model of previous use of the storage device.

The command can be at least one of a command to start the internal maintenance process, a command to stop the internal maintenance process, a command to start the internal maintenance process until the storage device receives user input/output, and a command to start the internal maintenance process and continue for a specified duration.

In another embodiment, a system can include a storage device and a host device configured to send a command to the storage device. The storage device can responsively run an internal maintenance process of the storage device.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1:
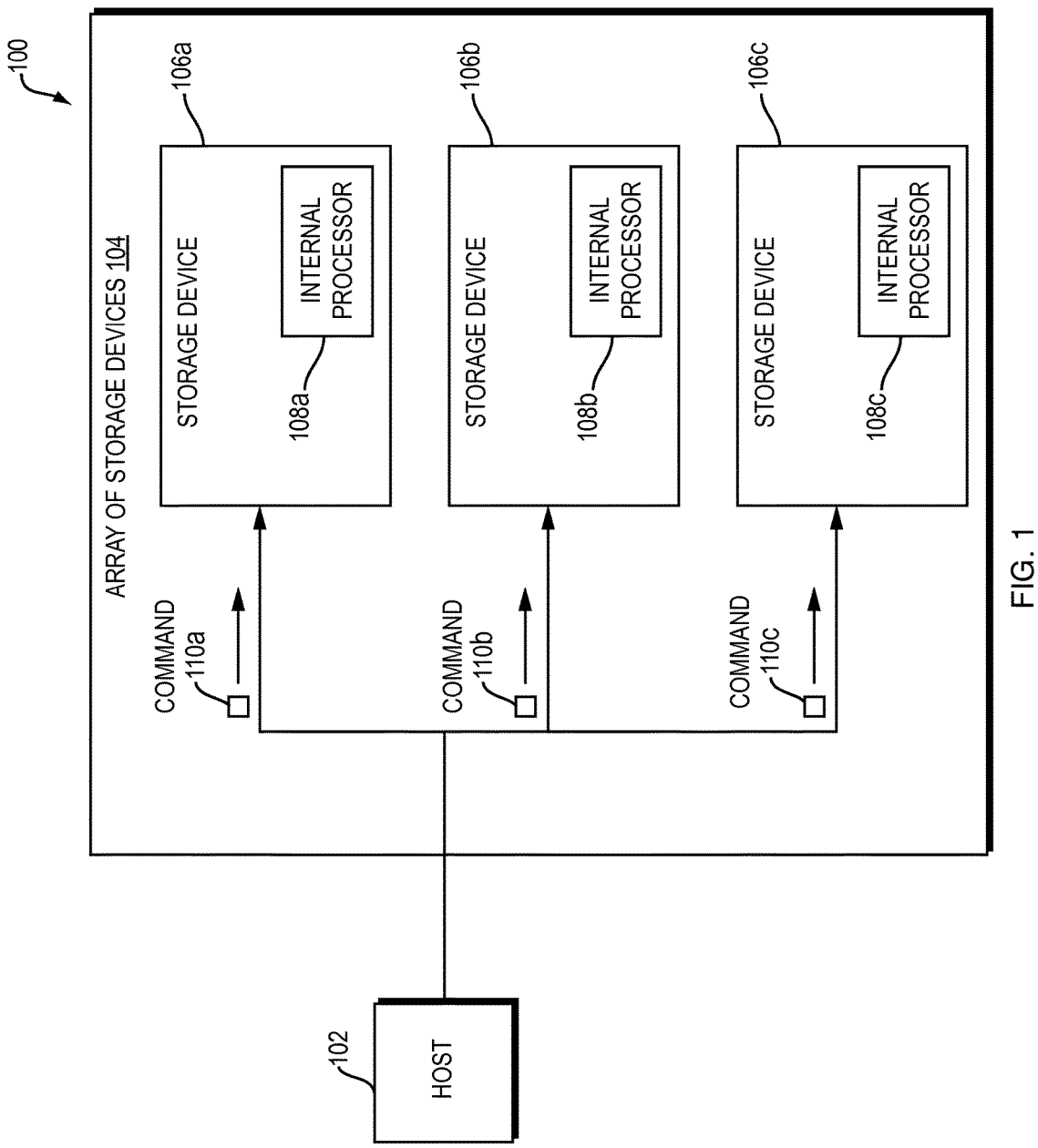
FIG. 1 is a block diagram illustrating an example embodiment of a host operatively coupled to an array of storage devices.

A description of example embodiments of the invention follows.

Many storage devices (or drives) include a mechanism, such as a processor, to execute internal maintenance process(es) that maintain data integrity and long-term drive health. One example of such an internal maintenance process is a background media scan (BMS or BGMS). The high areal density of large storage devices that can store multiple terabytes of date requires the media of the drive be actively maintained as part of normal operation. However, such active maintenance can compete with user activity, such as input/output to the drive. In some implementations, a BMS repeatedly examines the media of the storage device looking for problems. The BMS begins after the drive has been idle for some duration, such as 250 milliseconds, and stops immediately when a new input or output request arrives at the storage device. However, such an approach has two potential problems. First, on busy systems, the BMS may never have an opportunity to execute or it may execute less than is necessary to maintain a healthy state of the storage device, both of which can lead to data integrity problems. Second, on busy systems, inadequate BMS runtime can cause the storage device to force running a BMS while the drive is not idle. Such a forced BMS competes with user input/output and degrades performance. These potential problems are likely to be more common as drive capacity increases and BMS becomes more important to maintaining drive health.

BMS maintains drive health by determining whether the drive has any physical problems, or whether the signals stored on the drive have degraded. By running BMS regularly, physical problems on the drive can be avoided by preventing input/output on, and moving data away from, the sector where the physical problem has been found. Digital problems can be resolved by rewriting the digital data to produce a stronger signal on the drive. The data can have a weak signal because of writes to nearby data that change or reduce the strength of the magnetic (or other) signal.

A solution for these problems is enabling a host connected to the drives to decide when BMS should run. By integrating the host, the drive does not guess when the host is idle because the host knows when it is idle. For example, the host can send a command to the drive when the host knows it is idle so that the drive can begin BMS immediately. This prevents the drive from wasting idle time counting to an arbitrary idle threshold and prevents competition with the user for user input/output by better utilizing idle time. The host can also schedule BMS time by other schemes, such as time slicing. Time slicing increases the efficiency of BMS because BMS sequentially scans the drive. Running BMS interspersed with user input/output removes the advantage of sequential scanning of the drive because the drive head jumps from one area to the other between BMS commands.

To accomplish such a solution, various commands should be available for the host to issue to the drive. First, the host should be able to start and stop BMS on the drive on command. For example, the drive should have a command available to the host to start BMS immediately and another command available to the host to stop BMS immediately.

The host should be able to start BMS immediately a command such that BMS continues until the drive receives a user input/output. Upon receiving a user input or output request, the drive stops the BMS and executes the user input output.

The host should be able to start BMS on the drive such that immediate BMS runs for a specified duration of time or for a specified capacity/data length.

Further, to implement the solution, the BMS should have a short set-up time such that if the host provides a small time window for the BMS to run, the BMS utilizes most of the time scanning instead of executing overhead processes. In addition, the host should tell the drive when to run the BMS. The host should be responsible for detecting or anticipating idle periods when the BMS can run and sending the command to the drive to run BMS when it detects those conditions. The host should schedule sufficient BMS runtime to protect the date drive's integrity. In addition, correctable problems that the BMS detects may be reported to the host, or repaired. However, uncorrectable problems that are undetected by the BMS must be reported to the host.

The host can create idle periods for its drive by time-slicing, or interleaving BMS with user input/output. A heavy user workload that is forcibly interweaved with the single stream sequential workload of BMS can be performed with almost no loss in performance if done with time slicing because BMS is a single stream sequential process, which is similar to RAID reconstruction. On the other hand, BMS competing with user input/output is less efficient than time-slicing the BMS with user input output because the competition of the input/output causes the BMS to be essentially non-sequential. Such a time slicing method achieves a 1000% improvement in the single stream sequential workload with only a 10% degradation in user workload. A similar method is described in U.S. Pat. No. 5,313,626, assigned to Dell Products, LP, which is hereby incorporated by reference in its entirety.

The benefit of time slicing is that BMS impacts user input/output on a small scale or not at all. BMS therefore completes faster, runs less frequently, and presents less of a hindrance to user input/output performance.

For all scheduling methods of the solution, BMS executes and completes simultaneously on all drives controlled by the host, which leads to a more predictable host performance. In contrast, if some drives are running slower due to BMS interference and other drives are not, the array as a whole runs at the speed of the slower drives.

BMS further replaces media scans that the host might normally perform on its own because the BMS is now under host supervision. The BMS reports problems found to the host, therefore eliminating the reasons for the host to perform its own scan. Furthermore, the drive's internal BMS is better at detecting and predicting problems than any host-based scan.

In addition, the drive does not guess when the host is idle with the present invention. The drive normally cannot assume that a host has gone idle after one or 2 ms, so previously a threshold (such as 250 ms) of inactivity safely indicates that the host is idle. However, time spent waiting to reach the threshold can be used for scanning. If the host initiates BMS, there is no need for the drive to wait to reach the threshold and can use that time productively by running BMS. This allows idle intervals that are shorter than the threshold period to be used productively.

Some host based of systems employ heuristics to estimate underlying media issues. For example, U.S. Pat. No. 8,190, 945, which is hereby incorporated by reference in its entirety describes the use of input/output latency to detect latent tract degradation which triggers a host based read and rewrite of the affected area. However, on busy systems, such a method may never run.

FIG. 1 is a block diagram 100 illustrating an example embodiment of a host 102 operatively coupled to an array of storage devices 104. The host 102 is configured to send a command 110a-c to run internal maintenance process to each of a plurality of storage devices 106a-c within the array of storage devices 104. Each storage device 106a-c includes a respective internal maintenance processor 108a-c. Internal maintenance processor 108a-c is configured to receive the respective command 110a-c and run the internal maintenance process responsive to the command 110a-c. An example of an internal maintenance process is the BMS. Other examples are internal maintenance processes, garbage collection, wear leveling, and erase management.

Figure 2:
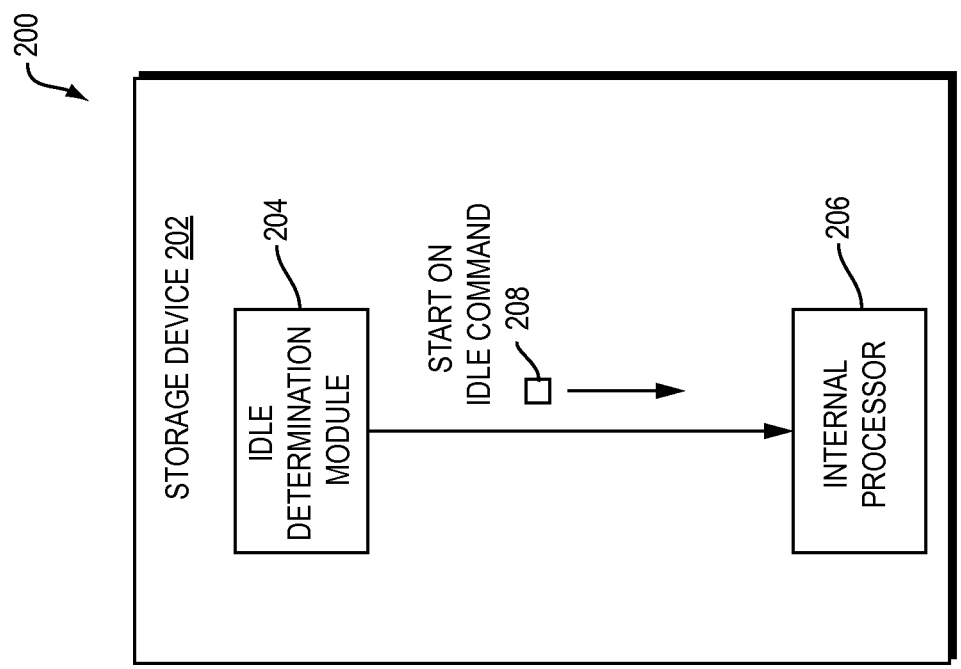
FIG. 2 is a block diagram illustrating an example embodiment of a storage device.

FIG. 2 is a block diagram 200 illustrating an example embodiment of a storage device 202. The storage device includes an idle determination module 204 and an internal maintenance processor 206. The idle determination module 204 is configured to determine whether the drive itself is idle. For example, the drive monitors activity until there has been no user input/output for an adjustable period of time. Upon such a determination, the idle determination module 204 sends a start on idle command 208 to the internal maintenance processor 206. Internal maintenance processor 206 then can initiate the internal maintenance process of the drive, such as the BMS or any other internal maintenance process.

This method of triggering the internal maintenance process of the internal maintenance processor suffers from all of the problems described above. For example, the drive has to wait until the threshold is met before it can begin its internal maintenance process. Therefore, on a busy drive, the internal maintenance process may never run. Since this is a requirement for certain drives, this can severely impact drive health. In addition, time spent waiting for the idle determination module to send the command is wasted because it could have been used by the internal maintenance process.

Figure 3:
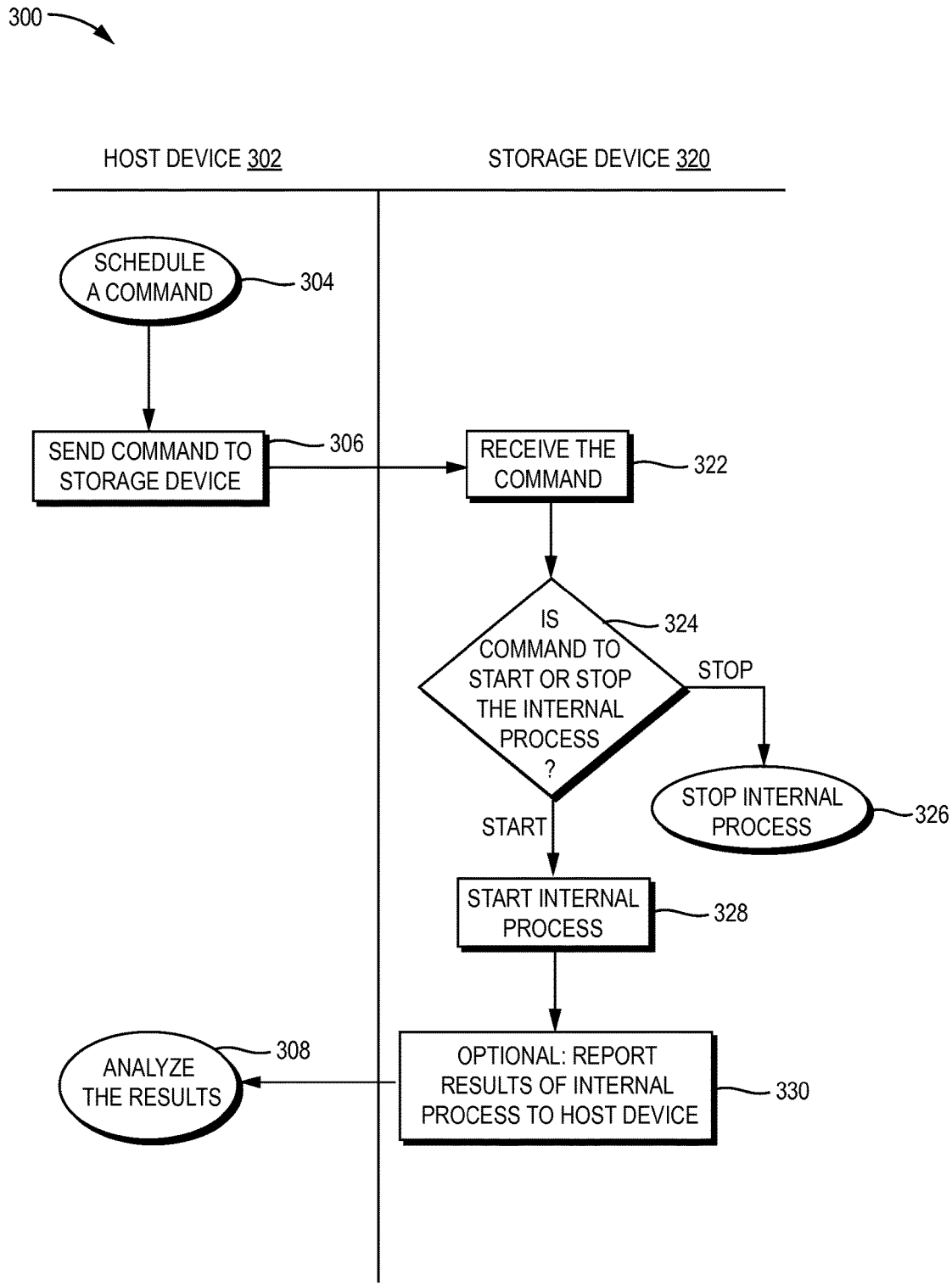
FIG. 3 is a flow diagram illustrating an example embodiment of a host device and storage device employing a process of the present invention.

FIG. 3 is a flow diagram 300 illustrating an example embodiment of a host device 302 and storage device 320 employing a process of the present invention. The host device 302 first schedules a command (304). The host device then sends the command to the storage device (306). Then, at the storage device 320, the storage device receives the command (322). The storage device then determines whether the command is to start or stop the internal maintenance process (324). If the command is to start the internal maintenance process, the storage device 320 starts the internal maintenance process (328). Optionally, the storage device then reports the results of the internal maintenance process to the host device 302 (330). The host device then analyzes the results (308). On the other hand, if the command is to stop the internal maintenance process, the storage device 320 then stops the internal maintenance process (326). A command to stop the internal maintenance process can be an explicit command to stop the internal maintenance process, a time delayed command based on the start time of the initial start command, or received a user input/output.

Figure 4A:
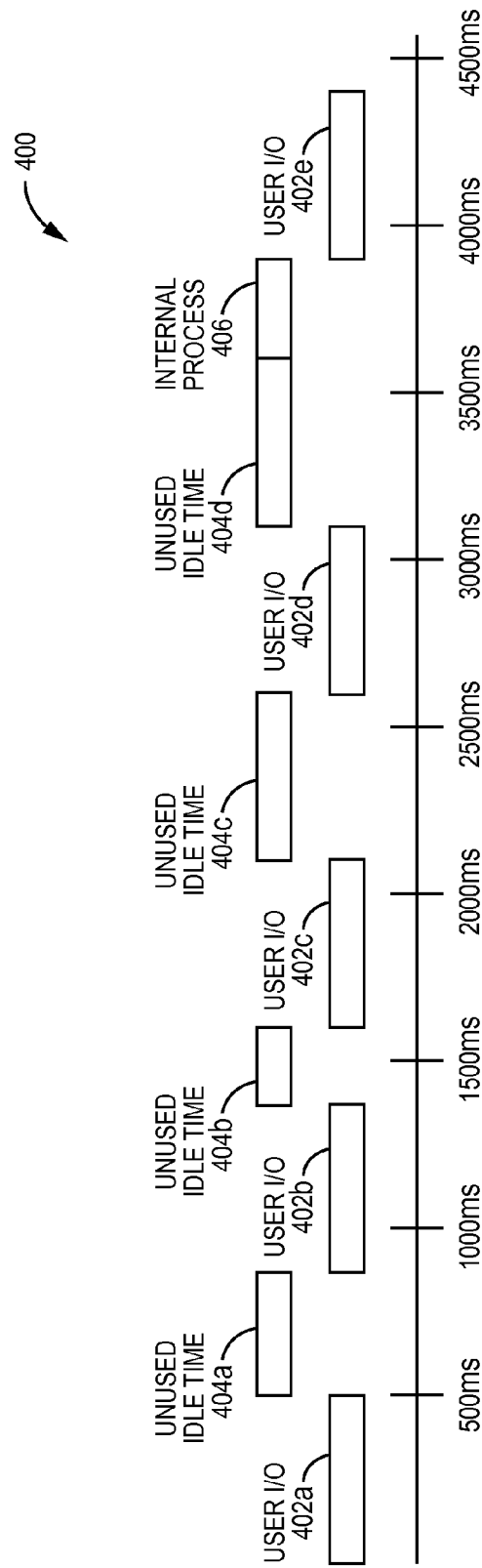
FIG. 4A is a diagram illustrating an example embodiment of user input/output and idle time of the drive without employing the present invention.

FIG. 4A is a diagram 400 illustrating an example embodiment of user input/output and idle time of the drive without employing the present invention. A drive receives a plurality of user input/outputs (I/Os) 402a-e. In this embodiment, the threshold for the internal maintenance process to run is set at 500 ms. After user I/O 402a, the driver spends unused idle time 404A waiting for the 500 ms threshold to elapse before it begins its internal maintenance process. However, after approximately 333 ms, another user I/O 402b commences, triggering unused idle time 404b after the user I/O 402b has finished. However, unused idle time 404b is also not long enough to trigger the internal maintenance process because user I/O 402c begins before the 500 ms threshold. Likewise, user I/O 402d begins exactly at the threshold of 500 ms, so that the internal maintenance process cannot begin because, even though the idle time may have been triggered, there is no idle time being triggered to run the internal maintenance process before the user I/O 402d begins. After user I/O 402d, unused idle time 404d lasts 500 ms, after which enough time elapses to begin the internal maintenance process 406. However, once user I/O 402e begins, the internal maintenance process 406 stops so that user I/O 402e can run.

The total of the unused idle time 404a-d is approximately 1500 ms. This is time that could have been used to run the internal maintenance process, which is only run for approximately 167 ms in this example.

Figure 4B:
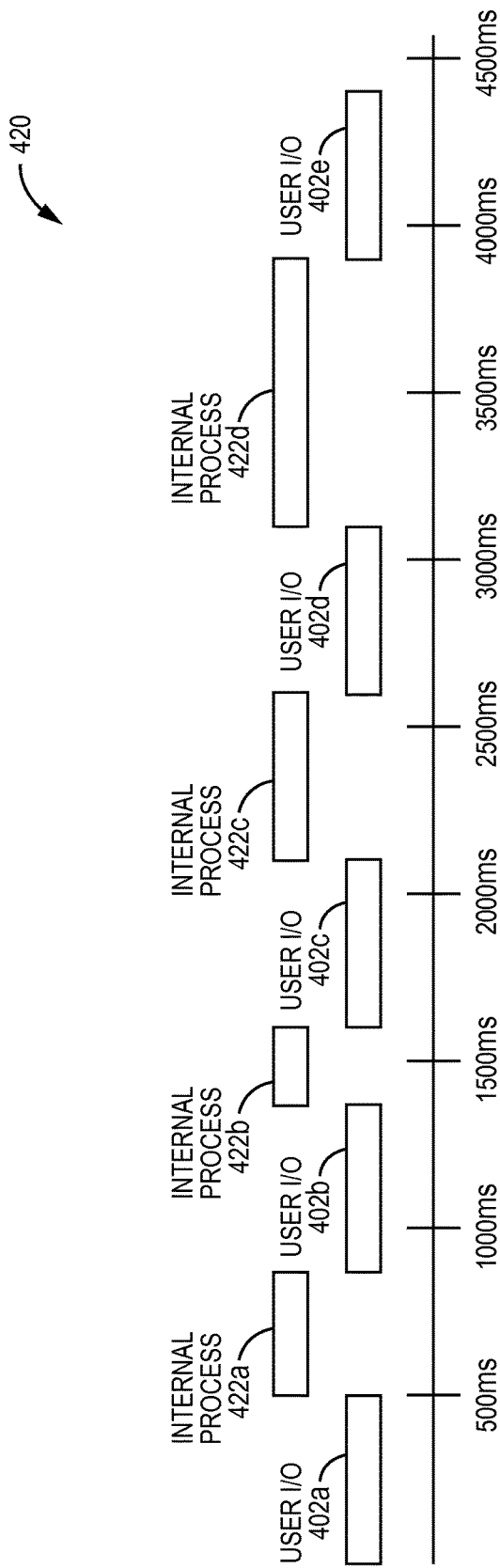
FIG. 4B is a diagram illustrating an example embodiment of the same user I/Os if performed with the system of the present invention.

FIG. 4B is a diagram 420 illustrating an example embodiment of the same user I/Os 402a-e if performed with the system of the present invention. Here, the internal maintenance processes 422a-d (triggered by the host) run during all of the idle time. The drive has no unused idle time because the drive does not wait for a threshold of idle time to pass before running the internal maintenance process. The host simply sends a command after the user I/O 402a-e has finished, which runs the internal maintenance processes 422a-d immediately.

Figure 5:
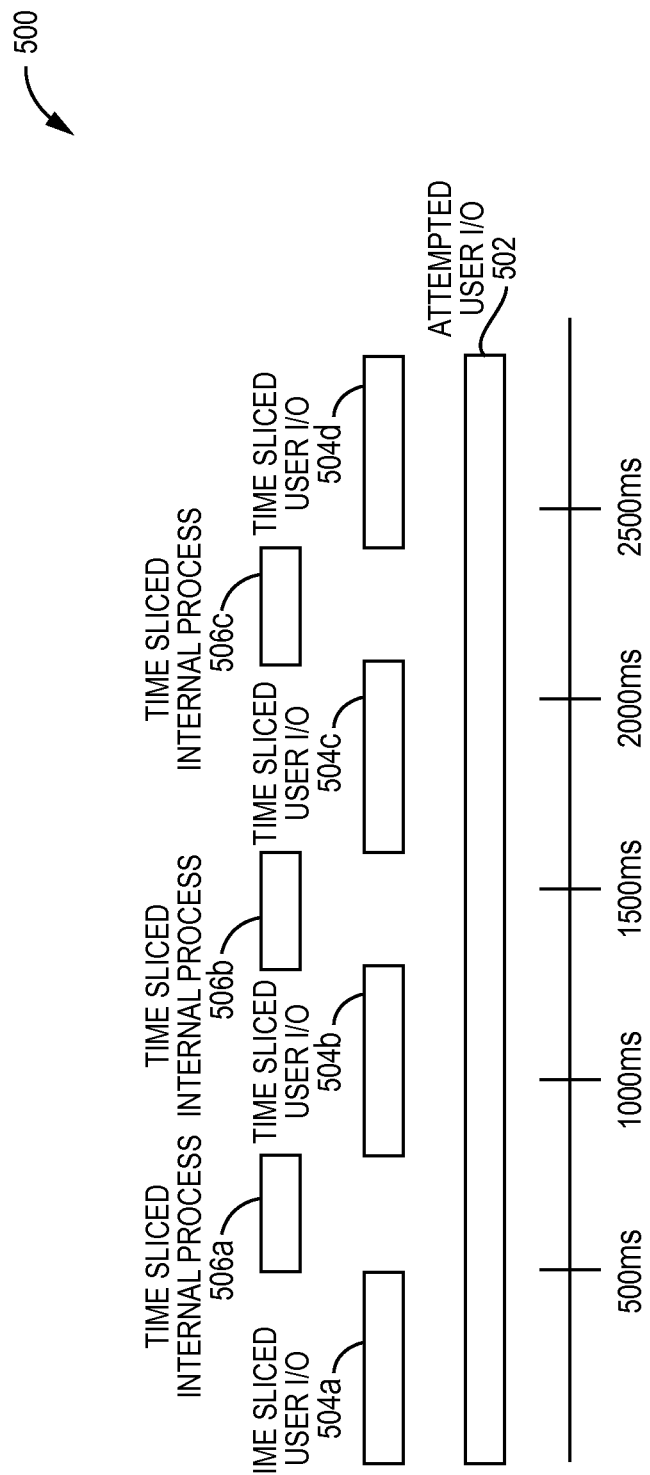
FIG. 5 is a diagram illustrating the host scheduling time slices to run the internal maintenance process and stop the attempted user input output.

FIG. 5 is a diagram 500 illustrating the host scheduling time slices to run the internal maintenance process and stop the attempted user input output 502. The host first schedules a time sliced user input output 504a which is interrupted by a time sliced internal maintenance process 506a for a period of time. Then, the host schedules time sliced user input output 504b, which is then interrupted by time sliced internal maintenance process 506. Further, the host then schedules times sliced user input output 504c, which is interrupted by time sliced internal maintenance process 506c. The host then schedule timed slice user input 504d to resume the attempted user input output 502. The host can continue to repeat this pattern by scheduling additional time slices and running the internal maintenance process during them.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method comprising:
   monitoring by a processor of a host device, whether a memory of the host device is storing any pending input/output (TO) commands to a storage device;
   determining, by the processor of the host device, that the storage device is idle if the host device is finished sending IO commands from the host device to the storage device,
   responsive to determining the storage device is idle, immediately sending an automated start command along a communication channel from the processor of the host device to an internal processor of the storage device, the storage device responsively running an internal maintenance process of the storage device;
   determining, by the processor of the host device, that the storage device is not idle if the memory of the host device is storing a pending IO command from the host device to the storage device,
   responsive to determining that the storage device is not idle, immediately sending an automated stop command along the communication channel from the processor of the host device to the internal processor of the storage device, the stop command responsively stopping the internal maintenance process of the storage device; and
   sending the pending IO command to the storage device.

2. The method of claim 1, wherein the internal maintenance process is a nondestructive internal maintenance process.

3. The method of claim 1, wherein the internal maintenance process is a background media scan.

4. The method of claim 1, wherein the internal maintenance process is at least one of garbage collection, wear-leveling, and erase management.

5. The method of claim 1, further comprising scheduling the command at the host device.

6. The method of claim 5, wherein scheduling the command further includes determining a particular time based on the host being idle.

7. The method of claim 5, wherein scheduling the command includes scheduling a recurring time period for the command and a recurring time period for an input/output command.

8. The method of claim 5, wherein scheduling the command includes determining a level of progress of the internal maintenance process and sending the command at a frequency as a function of the level.

9. The method of claim 5, wherein scheduling the command includes scheduling the command based on a statistical model of previous use of the storage device.

10. The method of claim 1, wherein the command is at least one of a command to start the internal maintenance process, a command to stop the internal maintenance process, a command to start the internal maintenance process until the storage device receives user input/output, and a command to start the internal maintenance process and continue for a specified duration.

11. A system comprising:
    a storage device with an internal processor; and
    a host device with a processor configured to:
    monitor whether a memory of the host device is storing any pending input/output (TO) commands to the storage device,
    determine that the storage device is idle if the host device is finished sending IO commands from the host device to the storage device,
    responsive to determining that the storage device is idle, immediately send an automated start command along a communication channel from the processor of the host device to the internal processor of the storage device, the storage device responsively running an internal maintenance process of the storage device, determine that the storage device is not idle if the memory of the host device is storing a pending IO command from the host device to the storage device, responsive determining the storage device is not idle, immediately send an automated stop command along the communication channel to the internal processor of the storage device, the stop command responsively stopping the internal maintenance process of the storage device, and send the pending IO command to the storage device.

12. The system of claim 11, wherein the internal maintenance process is a nondestructive internal maintenance process.

13. The system of claim 11, wherein the internal maintenance process is a background media scan.

14. The system of claim 11, wherein the internal maintenance process is at least one of garbage collection, wear-leveling, and erase management.

15. The system of claim 11, wherein the host device is further configured to schedule the command.

16. The system of claim 15, wherein the host device is further configured to schedule the command by determining a particular time based on the host being idle.

17. The system of claim 15, wherein the host device is further configured to schedule the command by scheduling a recurring time period for the command and a recurring time period for an input/output command.

18. The system of claim 15, wherein the host device is further configured to schedule the command by determining a level of progress of the internal maintenance process and sending the command at a frequency as a function of the level.

19. The system of claim 15, wherein the host device is further configured to schedule the command by scheduling the command based on a statistical model of previous use of the storage device.

20. The system of claim 11, wherein the command is at least one of a command to start the internal maintenance process, a command to stop the internal maintenance process, a command to start the internal maintenance process until the storage device receives user input/output, and a command to start the internal maintenance process and continue for a specified duration.

* * * * *

UNITED STATES PATENT AND TRADEMARK OFFICE
CERTIFICATE OF CORRECTION

PATENT NO. : 10,013,280 B2
APPLICATION NO. : 14/042313
DATED : July 3, 2018
INVENTOR(S) : Damon Hsu-Hung, Paul Guttormson and Bernard Rozmovits It is certified that error appears in the above-identified patent and that said Letters Patent is hereby corrected as shown below:

In the Claims

In Column 5, Line 67, Claim 1, delete "(TO)" and replace it with --(IO)--;

In Column 6, Line 57, Claim 11, delete "(TO)" and replace it with --(IO)--.

Signed and Sealed this
Twenty-first Day of August, 2018

Andrei Iancu
*Director of the United States Patent and Trademark Office*